United States Patent
Stabile (10) Patent No.: US 9,759,577 B2
(45) Date of Patent: Sep. 12, 2017

(54) ENERGY RESOURCE GEOGRAPHICAL OVERLAY

(76) Inventor: James R. Stabile, Newton, NJ (US)

( * ) Notice: Subject to any disclaimer, the term of this patent is extended or adjusted under 35 U.S.C. 154(b) by 109 days.

(21) Appl. No.: 13/616,534

(22) Filed: Sep. 14, 2012

(65) Prior Publication Data

US 2013/0090842 A1 Apr. 11, 2013

Related U.S. Application Data

(60) Provisional application No. 61/545,129, filed on Oct. 8, 2011.

(51) Int. Cl.
| | | |
|---|---|---|
| G06F 17/00 | (2006.01) | |
| G01C 23/00 | (2006.01) | |
| G08G 5/00 | (2006.01) | |
| G08G 5/02 | (2006.01) | |

(52) U.S. Cl.
CPC .......... *G01C 23/00* (2013.01); *G08G 5/0021* (2013.01); *G08G 5/0052* (2013.01); *G08G 5/0056* (2013.01); *G08G 5/025* (2013.01)

(58) Field of Classification Search
CPC ...... G06F 17/00; G01C 23/00; G08G 5/0021; G08G 5/0052; G08G 5/0056
USPC .................................................. 701/14, 123
See application file for complete search history.

(56) References Cited

U.S. PATENT DOCUMENTS

| | | |
|---|---|---|
| 3,969,616 A | 7/1976 | Mimken |
| 4,400,779 A | 8/1983 | Kosuge et al. |
| 5,067,081 A | 11/1991 | Person |
| 5,790,973 A | 8/1998 | Blaker et al. |
| 6,028,537 A | 2/2000 | Suman et al. |
| 6,453,731 B1 | 9/2002 | Yaegashi |
| 6,467,337 B2 | 10/2002 | Sadahiro et al. |
| 6,952,643 B2 | 10/2005 | Matsuoka et al. |
| 6,961,656 B2 | 11/2005 | Kim |
| 7,107,160 B2 | 9/2006 | Bean |
| 7,411,493 B2 | 8/2008 | Smith |
| 7,437,225 B1* | 10/2008 | Rathinam ....................... 701/14 |
| 7,579,940 B2 | 8/2009 | Schofield et al. |
| RE41,381 E * | 6/2010 | Stabile et al. ............. 244/118.5 |
| 7,731,374 B2 | 6/2010 | Takato |
| 7,889,063 B2 | 2/2011 | Rovik |
| 7,934,027 B2 | 4/2011 | Cooke et al. |
| 2004/0225432 A1* | 11/2004 | Pilley et al. ................... 701/117 |
| 2006/0185756 A1* | 8/2006 | Sato et al. ....................... 141/94 |
| 2007/0106636 A1 | 5/2007 | Sridharan et al. |

(Continued)

FOREIGN PATENT DOCUMENTS

| | | |
|---|---|---|
| EP | 0 624 860 A1 | 11/1994 |
| EP | 1 705 493 A1 | 9/2006 |

(Continued)

*Primary Examiner* — Redhwan K Mawari
*Assistant Examiner* — Rodney P. King
(74) *Attorney, Agent, or Firm* — Jon L. Woodard; Woodard International Law (57) ABSTRACT

A resource usage graphical overlay for a navigation system is disclosed. For each such resource, a resource exhaustion distance is computed, based on the consumption or lapse rate of the resource, and the vehicle speed. This resource exhaustion distance is scaled for the interactive map display and rendered as a service area on the interactive map so a user can determine what destinations are reachable before resources are completely depleted.

18 Claims, 9 Drawing Sheets

(56) References Cited

U.S. PATENT DOCUMENTS

| | | | |
|---|---|---|---|
| 2008/0143617 A1* | 6/2008 | Mancuso | G01R 29/10 343/703 |
| 2009/0109245 A1* | 4/2009 | Han | 345/684 |
| 2009/0265099 A1 | 10/2009 | Gottlieb | |
| 2010/0245124 A1 | 9/2010 | Bai et al. | |
| 2010/0280753 A1 | 11/2010 | Chytil et al. | |
| 2011/0046834 A1 | 2/2011 | Grider et al. | |
| 2011/0172871 A1* | 7/2011 | Hall et al. | 701/29 |

FOREIGN PATENT DOCUMENTS

| | | |
|---|---|---|
| KR | 2000074227 A | 12/2000 |
| WO | WO 2011 073765 A2 | 6/2011 |

\* cited by examiner

ENERGY RESOURCE GEOGRAPHICAL OVERLAY

CLAIM OF PRIORITY

This application claims priority of the U.S. Provisional Patent application No. 61/545,129 filed on Oct. 8, 2011, the contents of which is fully incorporated herein by reference.

FIELD OF THE INVENTION

The present invention relates generally to navigation displays and more particularly to a resource usage graphical overlay for a navigation display.

BACKGROUND

Flight Management Systems (FMS), and Navigation Management Systems (NMS) are utilized in aircraft and ships for navigation, and providing situational awareness to the pilot (or captain) through the use of various displays, such as a navigational map. In case of an emergency, a pilot can use FMS, or NMS functionality to find the nearest landing locations from the current aircraft position. This functionality provides a certain number of landing locations nearest to the current aircraft position. However, the pilot is often required to manually calculate the fuel requirements to each of these nearest airports by using data provided by the FMS, or NMS. It is desirable to improve the FMS, or NMS to provide greater assistance to the pilot, from the planning stage up to an event of an emergency.

U.S. Pat. No. 4,400,779 discloses a method and apparatus for indicating mileage corresponding to remaining fuel for a vehicle.

U.S. Pat. No. 5,790,973 discloses a warning system that alerts a vehicle operator to the fact that the net available exit should be take for a desired service.

WO 2011/073765 discloses a battery charging devise capable of inform the stage of the battery.

US 2011/0046834 discloses a vehicle including a controller determining a vehicle drive range based on fuel amount in the tank.

US 2010/0280753 discloses a method for displaying a navigational map with initial display setting and automatic updating of the display settings.

U.S. Pat. No. RE41,381 discloses a method for calculating oxygen required as well as a real time monitoring and calculating system for emergency conditions specifically aircraft.

Accordingly, various implements are known in the art, but fail to address all of the problems solved by the invention described herein. Certain embodiments of this invention are illustrated in the accompanying figures and will be described in more detail herein below.

SUMMARY

The resource usage geographical overlay system according to this disclosure aggregates large amounts of data and display a solution converted into a service area (distance) over an interactive and dynamic map display in real-time or in a planning mode as well. Potential applications include, but are not limited to, moving vehicles such as a car, boat or aircraft.

Multiple energy resources such as potential, kinetic, electric, gas, liquids such as hydraulics or water, cryogenic gases and temperature, to name a few, may be analyzed by embodiments of the present invention, and have a corresponding service area rendered on a display. For each such resource, a resource exhaustion distance is computed, based on the consumption/lapse rate of the resource, and the vehicle speed. This resource exhaustion distance is scaled for the interactive map display and rendered as a service area (circle or other shape) and then displayed around a point on the interactive map so the user can see in real time or calculated time what areas of serviceability such as an airport, gas station, hospital, harbor for example, are available before resources are completely depleted. Simply put, the user merely has to look at the interactive map which in the case for a pilot would display his solution, a suitable landing airport, and set course to achieve a safe landing. These time critical scenarios are of paramount importance in a variety of occupations.

A pilot in an aircraft which has lost all power and is forced to make an emergency landing has the ability to convert the potential energy gained through the altitude of the aircraft and based on the depletion of altitude over time (rate of descent) added to the velocity of the aircraft, has a similar advantage to display the service area and display airports that are within the drift down capability of this aircraft in real-time.

An embodiment of the present invention includes an application, where someone outside the moving vehicle has access to the same information that is displayed to the pilot, captain or driver of the vehicle. For example, when an aircraft is in an emergency situation the information is not only provided to the pilot but also to the control tower or flight control.

Embodiments of the present invention may also analyze heat and/or temperature. For example, in the event of a fire detected in a cargo area not visible to crew or passengers, temperature sensors can determine the rate of increase in temperature over a given time period and calculate when that temperature will reach a critical level determined by the aircraft manufacturer. This sets up a similar scenario to the previous examples by calculating a service area (e.g. a circle) for a time and/or distance that the aircraft must be on the ground. Safe airports are displayed for the pilot to choose from. The efficiency in analyzing the options available under intense conditions is unparalleled in today's world and this type product applies to multiple industries globally.

Embodiments of the present invention also have nautical applications. For example, an ocean vessel experiencing an emergency in the middle of the Pacific Ocean can use this predictive tool to perform analysis on an overlay of a map outlining land masses or other ships within their range to make the best choice based on current fuel and weather conditions. Situations involving more than one resource can be efficiently managed and risk is reduced accordingly.

In one embodiment of the present invention, a method for displaying information on a geographical display is disclosed. The method comprises computing a resource exhaustion distance for a plurality of resources, generating a service area for each of the plurality of resources, wherein each service area is sized proportionally to a corresponding resource exhaustion distance, and displaying each of the service areas on the geographical display. Each service area is displayed relative to a common position on the geographical display.

In another embodiment of the present invention, a system for displaying information on a geographical display is disclosed. The system comprises a memory which stores instructions. The system also comprises one or more processors attached to the memory wherein the one or more processors, when executing the instructions which are stored, are configured to compute a resource exhaustion distance for a plurality of resources and generate a service area for each of the plurality of resources. Each service area is sized proportionally to a corresponding resource exhaustion distance. Each of the service areas is displayed on the geographical display (map), and each service area is displayed relative to a common position on the geographical display.

In another embodiment, a system for displaying information on a geographical display is provided. This system comprises one or more computer processors, and memory containing computer instructions. The memory is configured to be readable by the one or more computer processors. Multiple inputs, including a current position input, a relative speed input, a cabin oxygen level input, an altitude input, and a fuel level input are fed into the system. A display monitor renders service areas on geographical displays (map displays). The one or more processors, when executing the instructions which are stored, are configured to compute a resource exhaustion distance for fuel at a current altitude received from the altitude input, compute a resource exhaustion distance for cabin oxygen at the current altitude, render a service area for fuel on the display monitor, and render a service area for cabin oxygen on the display monitor. Also external variables that can affect the size and distance of the service areas such as wind, altitude, tide, current, resistance, temperature, to name just a few can be factored into such algorithms as to provide a more accurate solution based on the amounts these variable may have on the solution under normal circumstances.

Therefore, the present invention succeeds in conferring the following, and other not mentioned, desirable and useful benefits and objectives.

It is an object of the present invention to provide a method for displaying information on a geographical display, comprising: computing a resource exhaustion distance for a plurality of resources; generating a service area for each of the plurality of resources, wherein each service area is sized proportionally to a corresponding resource exhaustion distance; and displaying each of the service areas on the geographical display, wherein each service area is displayed relative to a common position on the geographical display.

It is another object of the present invention to provide a system for displaying information on a geographical display comprising: one or more computer processors; memory containing computer instructions, and configured to be readable by the one or more computer processors; a current position input; a speed input; a cabin oxygen level input; an altitude input; a fuel level input; and a display; wherein the one or more processors, when executing the instructions in the memory, are configured to: compute a resource exhaustion distance for fuel at a current altitude received from the altitude input; compute a resource exhaustion distance for cabin oxygen at the current altitude; render a service area for fuel on the display; and render a service area for cabin oxygen on the display.

DETAILED DESCRIPTION OF THE INVENTION

Figure 1:
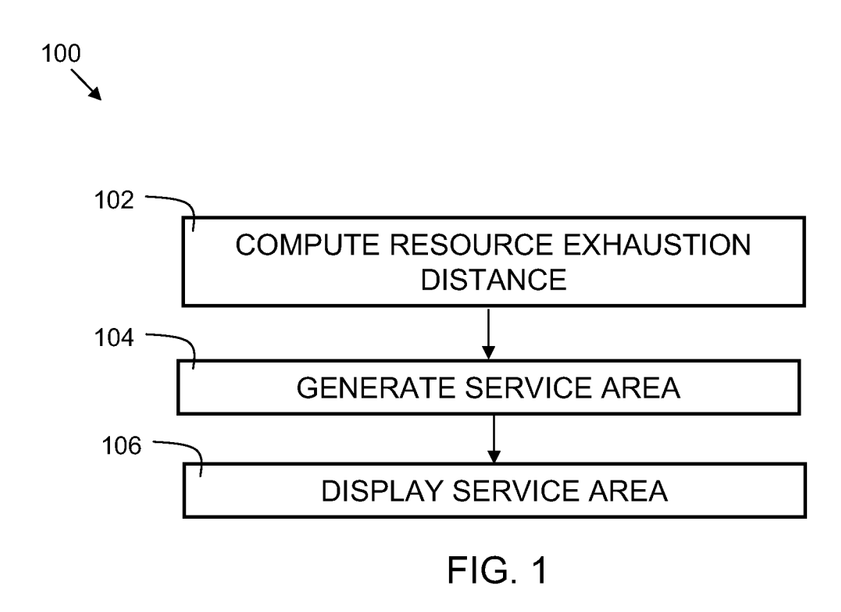
FIG. 1 is a flowchart showing process steps for an embodiment of the present invention.

FIG. 1 is a flowchart 100 showing process steps for an embodiment of the present invention. In process step 102, a resource exhaustion distance (RED) is computed. Multiple resources may be considered, and a RED may be computed for each resource. For example, a first RED may be computed for remaining fuel, and a second RED may be computed for remaining cabin oxygen, for example. In one embodiment, the RED is computed by calculating a resource exhaustion time (RET) and multiplying that by the current vehicle speed (Vs):

$$RED = RET \times Vs$$

In process step 104, a service area is generated for each resource exhaustion distance. The service area may be rendered as a variety of geometrical shapes such as a circle, ellipse, oval, or other closed shape. The size of the service area is sized proportionally to the RED. For example, if the RED for a given resource is 80 miles, and the scale factor for the map is 5 pixels per mile, then the radius of the service area is then 80×5=400 pixels. In general, the RED is multiplied by a scale factor of S pixels per mile to obtain the scaled resource exhaustion distance P of the service area in pixels:

$$RED \times S = P$$

In process step 106, each service area is displayed on a map that shows positioning information. Each service area is sized proportionally to a corresponding resource exhaustion distance. The map may include a current position indicator (CPI), geographical information, and airports, and/or other relevant waypoints. In one embodiment, the user provides various data prior to computing the service areas. This data may include, but is not limited to, the zero fuel weight of the aircraft, the number of crew members, the number of passengers, and one or more diversion airports. Flight plan elements such as planned altitude, initial fuel amounts, latitude, and oxygen pressure levels may also be provided.

One skilled in the art would recognize that it would be also possible to display the resource exhaustion time (RET) for example on a digital screen. Such simple embodiment would not use computing resource exhausting distance (RED) and could be used for example to provide an alarm system for portable oxygen generators to monitor the status of the battery.

Figure 2:
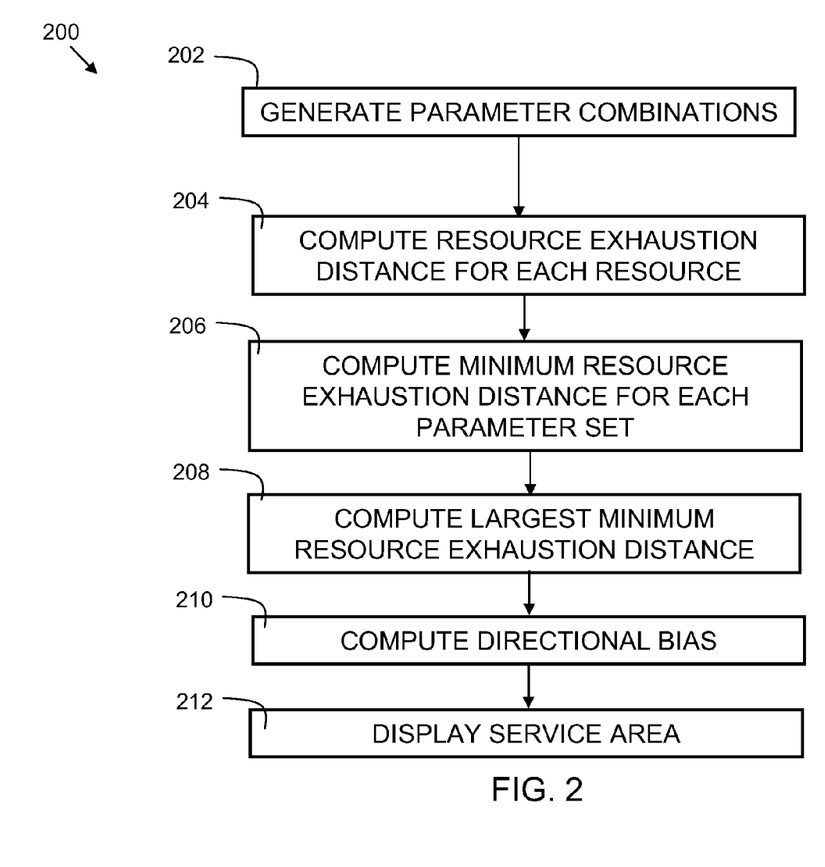
FIG. 2 is a flowchart showing process steps for an additional embodiment of the present invention.

FIG. 2 is a flowchart 200 showing process steps for an additional embodiment of the present invention. In this embodiment, a variety of combinations of parameters are evaluated to determine a preferred set of parameters for a voyage. A list of such parameters is generated, which may include, but is not limited to, speed, altitude, weight, and direction. In process step 202, multiple combinations of input parameters are generated. These parameters are used to compute an RED for each resource being evaluated. For example, with altitude as an input parameter, altitudes between 20,000 and 30,000 feet at 1000 foot increments may be used in the evaluation. A RED is computed for each resource based on the combinations of the parameters. Hence, each altitude, 20,000 ft., 21,000 ft., and so on is evaluated and a corresponding RED for each resource is computed in process step 204. In process step 206 a minimum resource exhaustion distance is computed for each parameter set. Table 1 and table 2 below show an example with two input parameters (altitude and speed) and two resources (fuel and oxygen).

Parameters: Altitude 32,000 ft. Speed 420 knots

TABLE 1

| Resource | RED |
|---|---|
| Fuel | 175 nautical miles |
| Oxygen | 50 nautical miles |

Parameters: Altitude 15,000 ft. Speed 390 knots

TABLE 2

| Resource | RED |
|---|---|
| Fuel | 115 nautical miles |
| Oxygen | 125 nautical miles |

In the case of table 1, a RED is computed for the resources of fuel and oxygen based on the parameters of altitude and speed. In the case of table 1, the minimum resource exhaustion distance (MRED) for the parameter set is 50, which is associated with the resource of oxygen. In the case of table 2, the lower altitude requires less oxygen, but also causes increased fuel consumption. Hence, the case of table 2, the MRED is 115, which is associated with the resource of fuel. The MRED represents the maximum range given the parameter assumptions. In process step 208, the largest MRED is computed. In the example of table 1 and table 2, the largest MRED is 115 (from table 2). Thus, embodiments of the present invention identify a MRED, and the corresponding input parameters and may then report those input parameters to the pilot via a display or other instrumentation, such that the pilot may set the craft accordingly. In the above example, the system advises the pilot to establish an altitude of 15,000 feet and a speed of 390 knots to achieve the desired MRED. Hence, embodiments of the present invention can assist a pilot in managing the tradeoff between fuel consumption and oxygen consumption as a function of altitude.

In process step 210, optionally, a directional bias is computed. In an aviation application, the directional bias takes into account wind speed and direction. In a nautical application, water current speed and direction may be considered instead of, or in addition to, wind speed and direction. The wind speed and direction may be received via a data service such as a weather report. Alternatively, the wind speed may be deduced from comparing the airspeed reported by on-board sensors with ground speed reported by a geographical positioning system. The geographical positioning system may be a global navigation satellite system such as GPS, GLONASS, or Galileo. Alternatively, a land-based navigation system such as LORAN may be used as the geographical positioning system or accessing this data from the aircrafts onboard IRS (inertial reference system) or INS (inertial Navigation System) may also be used. By computing a directional bias, the indicated range can reflect the ambient conditions. For example, if flying with a strong tailwind, the reachable distance is not symmetrical, but is instead skewed with a greater range in the direction of the tailwind. In step 212, the service area is displayed on a map. The map may indicate geographical features as well as airports and other waypoints. Optionally, a current position indicator may also be rendered. Airports within the service area are considered to be within range, given the resource(s) under consideration.

Figure 3:
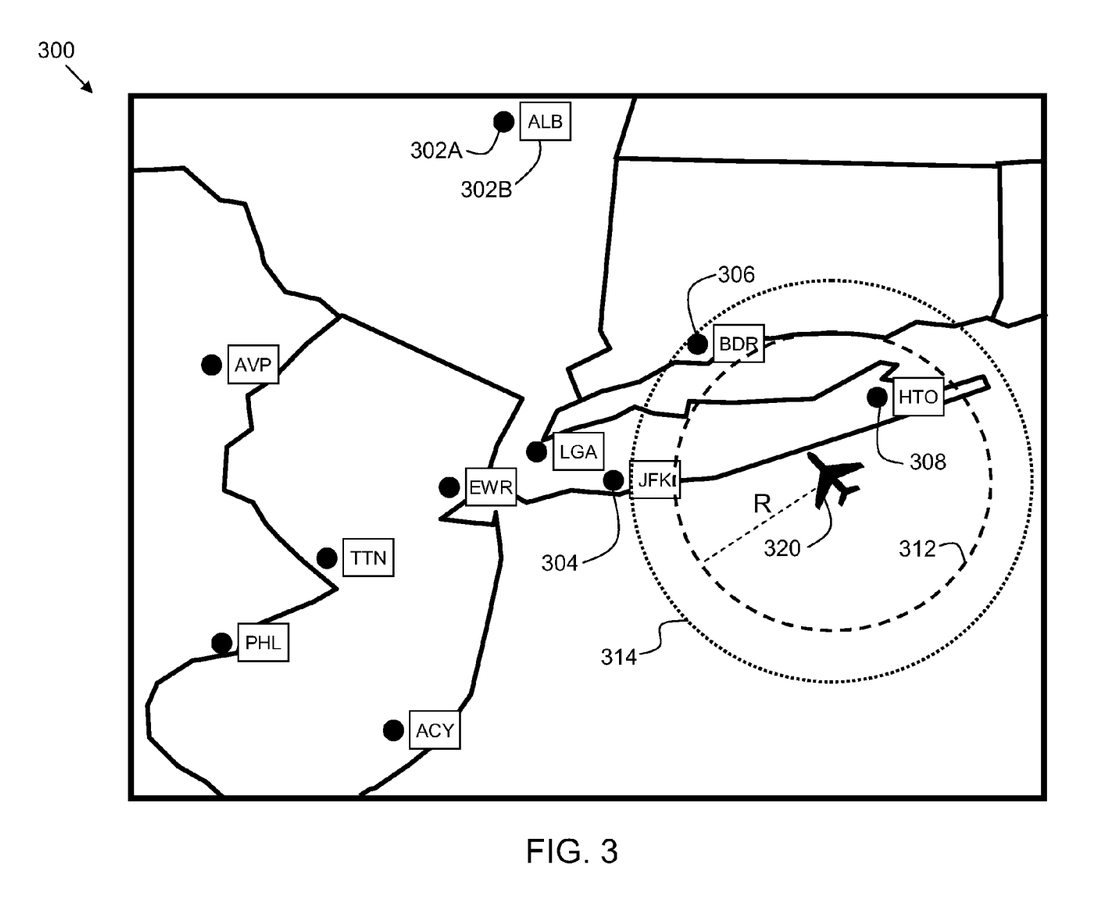
FIG. 3 is a resource usage graphical overlay in accordance with an embodiment of the present invention.

FIG. 3 is a resource usage graphical overlay 300 in accordance with an embodiment of the present invention. Multiple airports are shown on graphical overlay 300. In general, each airport is indicated with a symbol 302A, and may also include an identifier 302B. Service area 312 indicates a resource exhaustion distance (RED) for a particular resource (e.g. fuel). Service area 314 indicates a RED for a different resource (e.g. cabin oxygen). In one embodiment, each service area is shown with a different line pattern. For example, service area 312 is rendered with long dashes while service area 314 is rendered with dots. In another embodiment, each service area is rendered with a line of a different color to further distinguish the service areas. For example, the service area 312 may be rendered with a red line and the service area 314 may be rendered with a blue line. As shown, the service areas are rendered as circles, and each circle has a radius R which represents the scaled resource exhaustion distance for that resource. However, other shapes, such as an ellipse, oval, or other closed shape may also be used. While fuel and cabin oxygen are the resources used in the aforementioned examples, other resources may also be used, such as battery life and remaining altitude, which are relevant resources during a total engine failure. A current position indicator 320 is rendered within the interior of the service areas 312 and 314, and shows the current position and course for an airplane.

Airport 304 is outside of service area 314 and hence is considered out of range. Airport 306 is inside of service area 314 but outside of service area 312, and hence is also out of range. Airport 308 is inside both service areas (312 and 314), and hence is considered to be in range. Service area 312 is the smallest among the service areas, and thus represents the minimum resource exhaustion distance (MRED). In one embodiment, the pilot enters a desired destination or waypoint, and an alert is generated (aurally and/or visually) if the desired destination is outside the range of the MRED. For example, in the case of FIG. 3, if the pilot of the plane intended to land at airport 304, an alert is then provided to the pilot since that airport is outside the MRED service area 312.

Figure 4:
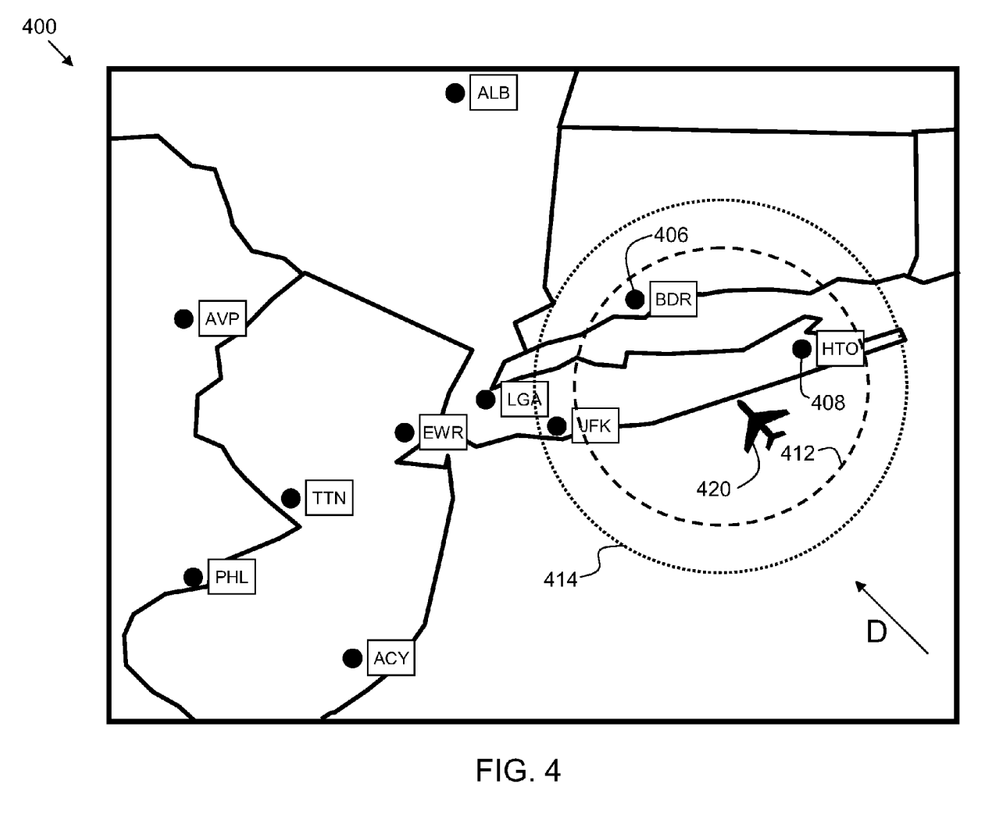
FIG. 4 is a resource usage graphical overlay in accordance with an additional embodiment of the present invention.

FIG. 4 is a resource usage graphical overlay 400 in accordance with an additional embodiment of the present invention. In this embodiment, a directional bias (indicated by arrow "D") is applied to the resource areas. As shown, the directional bias reflects a tailwind, such that the service areas are now rendered skewed such that the range reflects the tailwind. Hence, there is more range ahead of the current position as compared to behind the current position. By applying a directional bias, the service areas 412 and 414 are rendered to reflect the additional forward range given by the tailwind. Hence, both airport 406 and airport 408 are now considered in range, as they are both within the innermost service area 412, whereas without the directional bias, airport 406 is deemed out of range (compare with 306 of FIG. 3, which is outside of service area 312). A current position indicator 420 shows the current position and course for an airplane. Unlike current position indicator 320 of FIG. 3, current position indicator 420 is not rendered in the center of service areas 412 and 414, but instead is off-center, and its position within the service areas 412 and 414 is representative of the directional bias.

Figure 5:
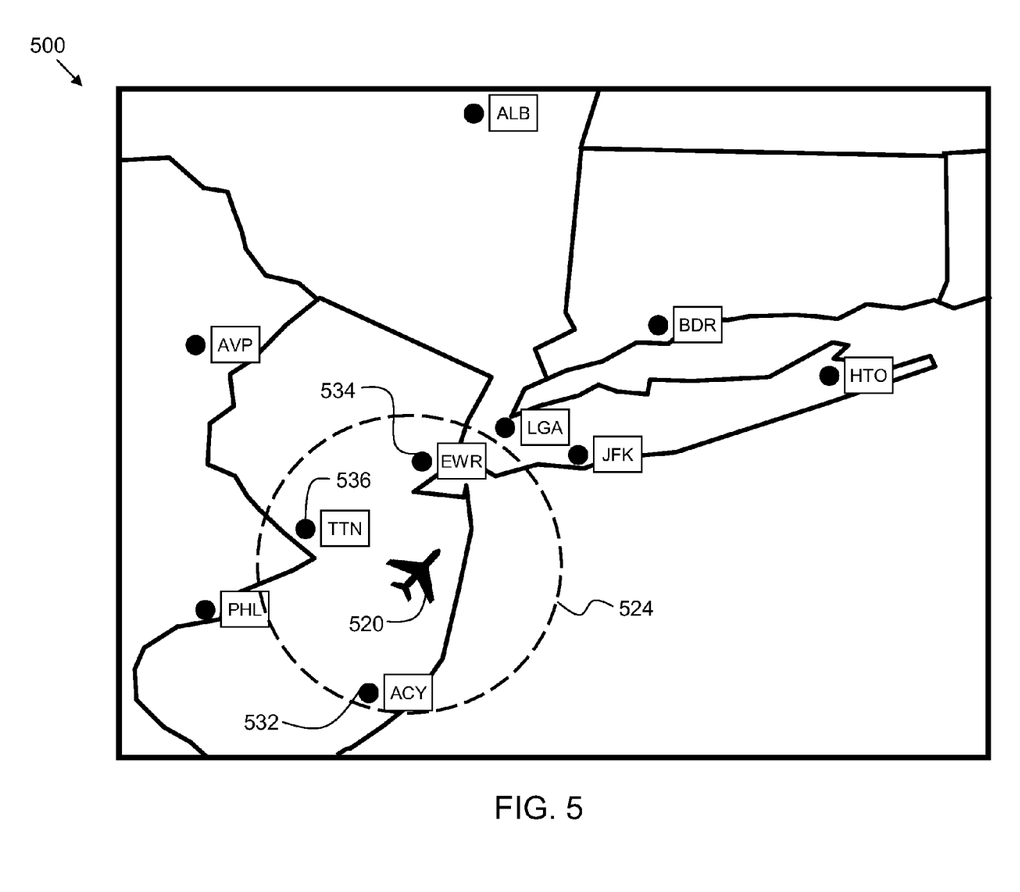
FIG. 5 is a resource usage graphical overlay in accordance with an additional embodiment of the present invention.

FIG. 5 is a resource usage graphical overlay 500 in accordance with an additional embodiment of the present invention. In this embodiment, only one service area is rendered. Service area 524 represents the minimum resource exhaustion distance (MRED) for the current input parameters. The current input parameters may include, but are not limited to, speed, altitude, direction, and total vehicle weight. In this way, the display is less busy and a user can clearly see the airports in range. In this case, airports 532, 534, and 536 are within range. Current position indicator 520 indicates position and course of the aircraft.

Figure 6:
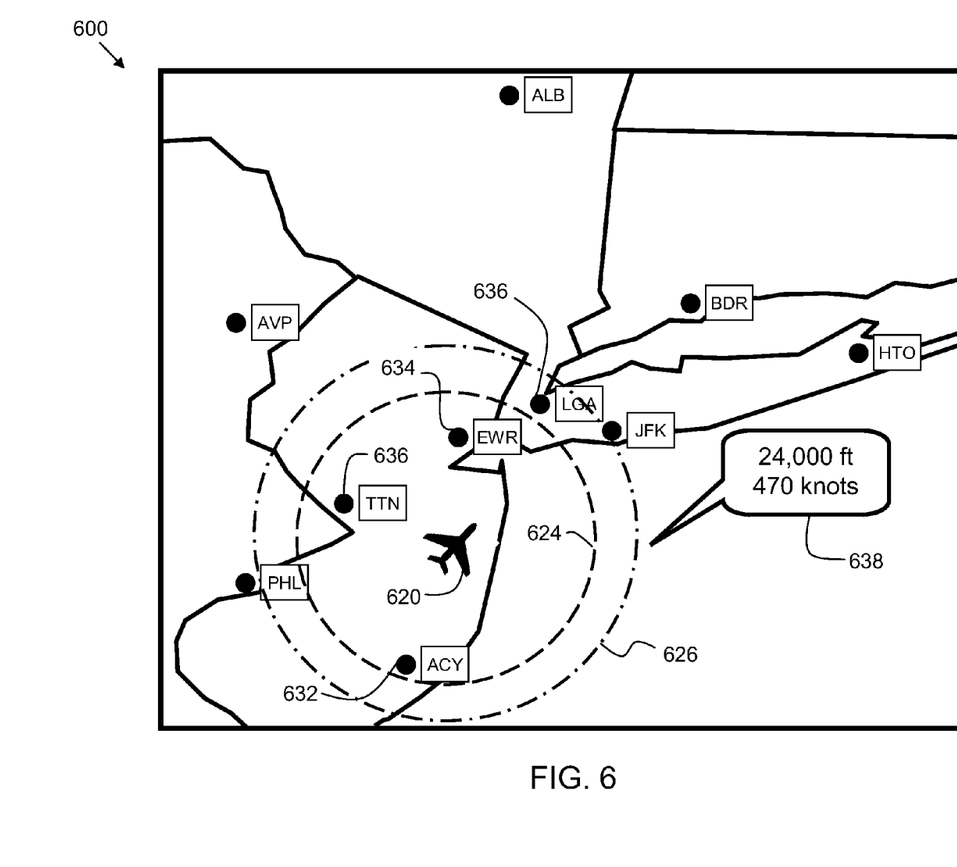
FIG. 6 is a resource usage graphical overlay in accordance with an additional embodiment of the present invention.
Figure 6A:
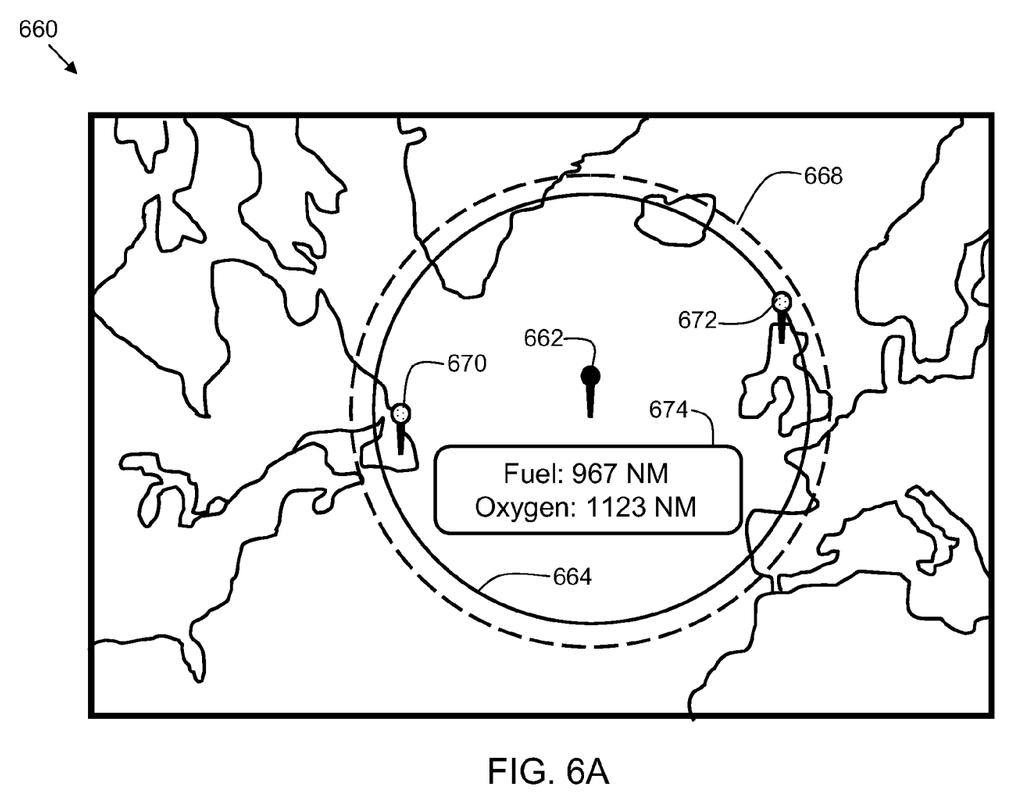
FIG. 6A is a resource usage graphical overlay in accordance with an additional embodiment of the present invention.

FIG. 6 is a resource usage graphical overlay 600 in accordance with an additional embodiment of the present invention. In this embodiment, two service areas are shown. Service area 624 represents a current MRED, which is based on the current input parameters (speed, altitude, etc.). Service area 626 represents a preferred MRED, which correlates to setting the aircraft to follow preferred input parameters. In this example, the input parameters of altitude and speed are considered. Display indication 638 displays to a pilot the recommended input parameter values to achieve the preferred MRED. In this case, the recommended input parameter value is an altitude of 24,000 feet and airspeed of 470 knots. Hence, if the pilot establishes an altitude of 24,000 feet and airspeed of 470 knots for the plane, then the service area 626 is achieved. In this example, the current MRED encompasses airports 632, 634, and 636. Whereas the preferred MRED also encompasses airport 636. Hence, by establishing the recommended altitude of 24,000 feet, another airport comes within range. In some embodiments, other recommended input parameter values such as course may also be displayed in display indication 638. Current position indicator 620 indicates position and course of the aircraft FIG. 6A is a resource usage graphical overlay 660 in accordance with an additional embodiment of the present invention. In this embodiment, two service areas are shown. Service area 664 corresponds to a fuel resource exhaustion distance. Service area 668 corresponds to an oxygen resource exhaustion distance. Current position indicator 662 indicates the current position of the aircraft. Airport indicators 670 and 672 indicate airports. These airports are within range of service area 664 and hence are considered to be in range. Display indication 674 provides a textual indication of the RED for fuel (967 nautical miles) and the RED for oxygen (1123 nautical miles).

Figure 7:
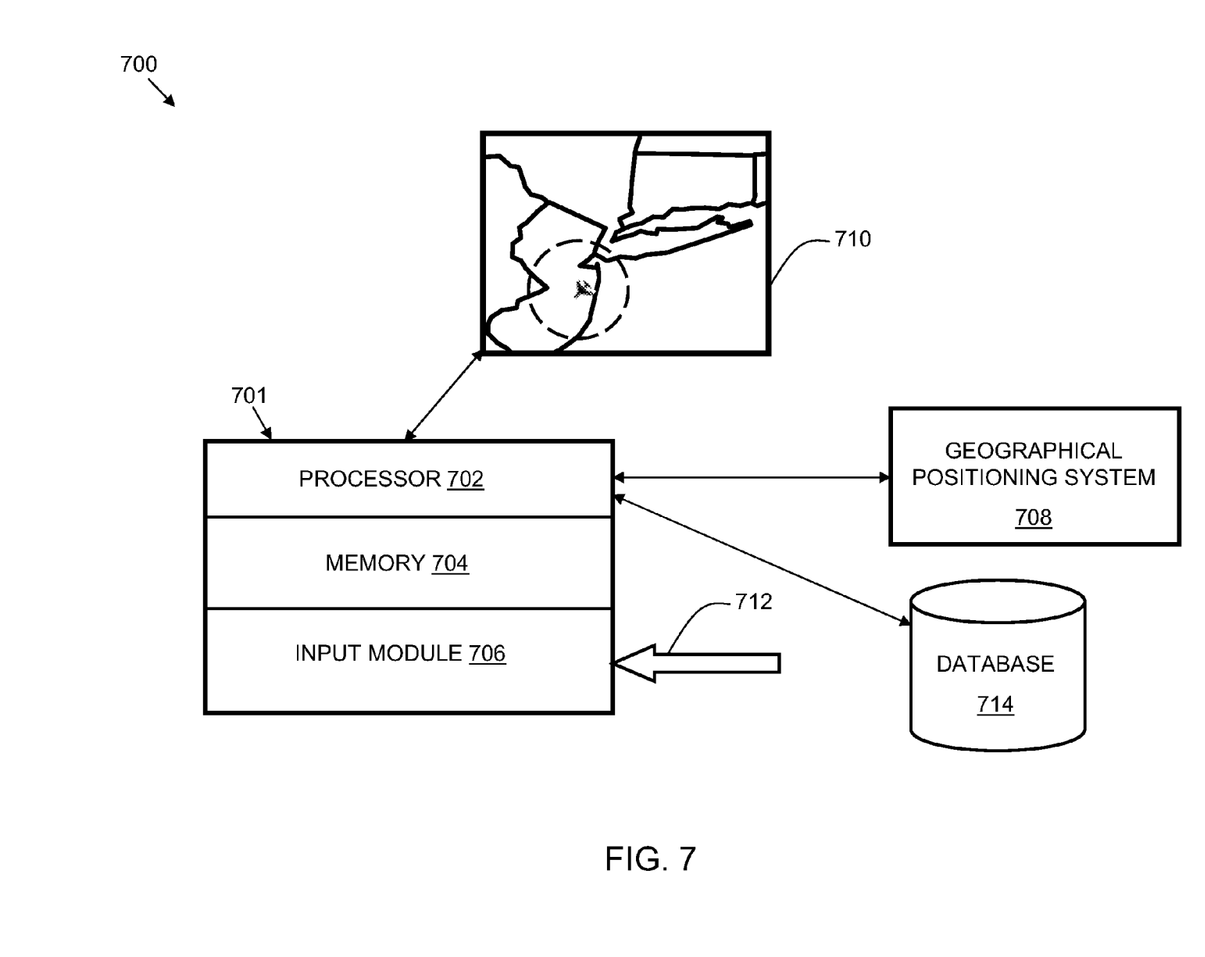
FIG. 7 is a system diagram of an embodiment of the present invention.

FIG. 7 is a system diagram 700 of an embodiment of the present invention. System diagram 700 comprises computer system 701 which comprises at least one processor 702. Processor 702 reads non-transitory memory 704 which stores machine-readable computer instructions. Input module 706 receives inputs 712 from the vehicle. Inputs 712 may include, but are not limited to, remaining fuel level, remaining cabin oxygen level, speed, altitude, current position, descent rate, course heading, and fuel consumption rate. Optionally, a geographical positioning system 708 may be used to establish a directional bias. The geographical positioning system may include, but is not limited to, GPS, GLONASS, Galileo, and LORAN IRS or INS. System 700 also comprises a display 710. The processor 702 executes computer instructions residing in memory 704 and renders a map with one or more service areas on the display 710.

Display 710 may be a CRT, LCD, plasma, iPad or other suitable technology. Furthermore, display 710 may be a touch-screen display that responds to user input. Optionally, processor 702 may also access information from a database 714. Database 714 may contain geographical information, such as map data, and an aircraft database, which includes information about specific aircraft types, such as nominal weights and fuel consumption rates. Information from database 714 may be used to generate planned service areas to allow a pilot to see various options available to him or her. In one embodiment, the database 714 may be remote, and accessed via a communications network, such as the Internet.

In some embodiments, the display 710 may be integrated into the cockpit of an aircraft. In some embodiments, the display 710 may be in control tower or flight control. In another embodiment, the display 710, geographical positioning system 708, and computer system 701 may be part of an integrated device such as a laptop computer, tablet computer, smart phone, or the like.

Figure 8:
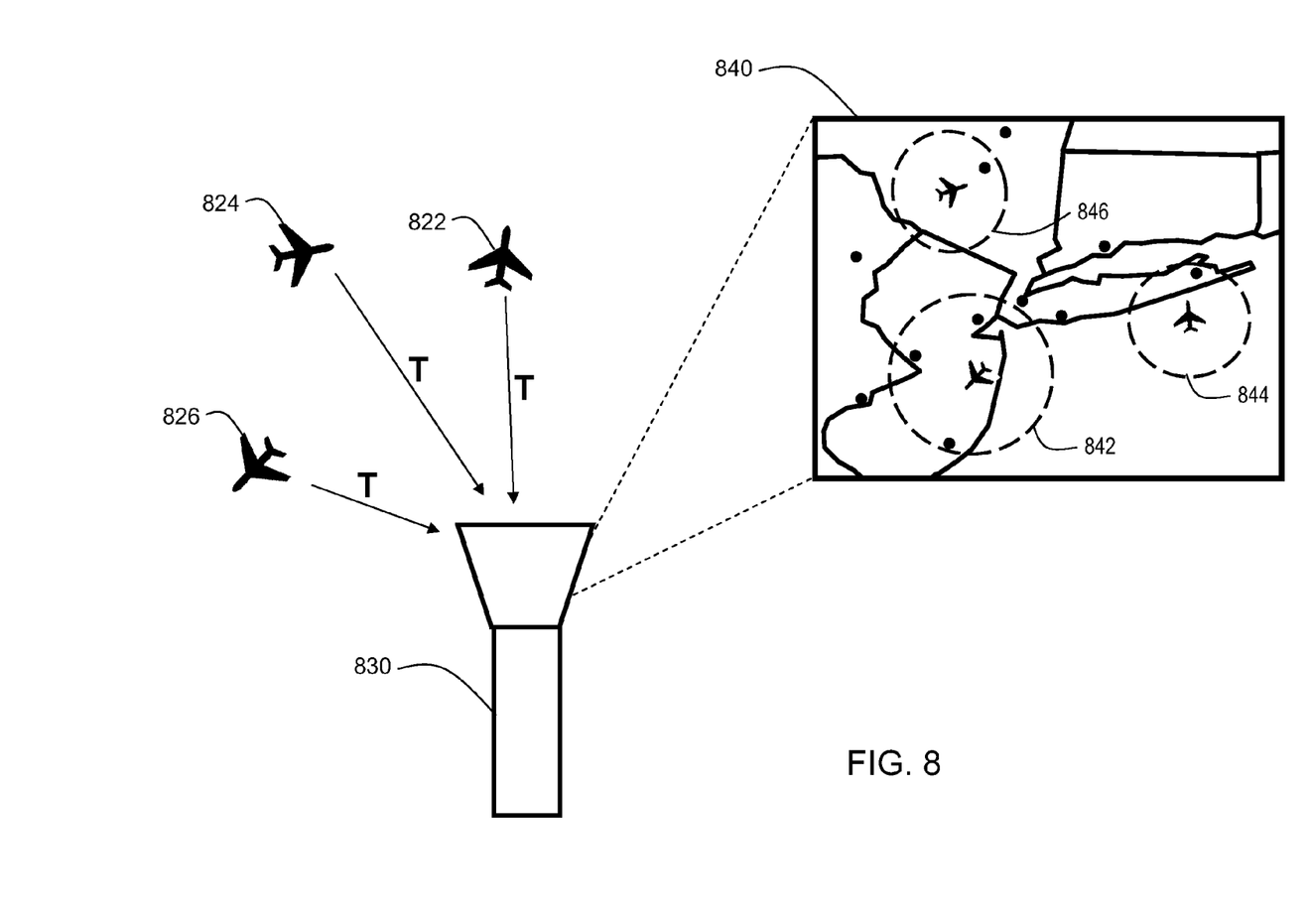
FIG. 8 shows an additional embodiment of the present invention.

FIG. 8 shows an additional embodiment of the present invention. In this embodiment, a system such as system 700 (FIG. 7) may be integrated into an air traffic control (ATC) system. In this embodiment, telemetry data T may be received at a receiving station 830 from multiple aircraft (indicated as 822, 824, and 826) which may include a current and preferred MRED. Receiving station 830 may be an air traffic control tower. The ATC display 840 may then display an MRED for multiple aircraft simultaneously. In the embodiment shown, three MREDs (842, 844, and 846) corresponding to three different aircraft are displayed simultaneously. In this way, an air traffic controller can further assist pilots undergoing an emergency situation.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method for displaying information on a geographical display, comprising:

computing for an individual vehicle at any chosen time of a voyage multiple resource exhaustion distances for a plurality of resources with any chosen combinations of parameters characterizing the voyage based on resource exhaustion time of each resource and vehicular velocity;

generating a service area for each of the plurality of resources, wherein a directional bias is computed for the service area, wherein a current location symbol is rendered on the service area and the position of the current location symbol is representative of the directional bias, and wherein each service area is sized proportionally to a corresponding resource exhaustion distance, multiplying the corresponding resource exhaustion distance by a scale factor to compute a scaled resource exhaustion distance having a service area defined by the scaled resource exhaustion distance; and displaying each of the service areas simultaneously on the geographical display, wherein each service area is displayed relative to a current position on the geographical display, thereby allowing the user to choose a preferred destination for the voyage based on the display.

2. The method of claim 1, wherein displaying each of the service areas on the geographical display comprises displaying each service area with a different color or different line pattern.

3. The method of claim 1, wherein each service area is rendered as a circular shape.

4. The method of claim 1, wherein generating a service area for each of the plurality of resources comprises generating a service area for fuel and generating a service area for cabin oxygen.

5. The method of claim 4, further comprising displaying a textual indication of a resource exhaustion distance for fuel and a resource exhaustion distance for cabin oxygen.

6. The method of claim 1, wherein the chosen parameters characterizing the voyage are chosen from the group consisting of altitude, speed, direction, and total vehicle weight.

7. The method of claim 1, wherein generating a service area for each of the plurality of resources further comprises rendering a circular shape having a radius equal to the scaled resource exhaustion distance.

8. The method of claim 1, wherein computing a resource exhaustion time for a plurality of resources comprises computing a resource exhaustion time for a plurality of resources based on a recommended speed value or a recommended altitude value.

9. The method of claim 8, wherein a minimum resource exhaustion time is determined and only a service area generated by using the minimum resource exhaustion time is displayed.

10. The method of claim 1, further comprising:
determining if a waypoint or destination is rendered within each of the service areas on the geographical display; and
generating an alert if the waypoint or destination is rendered outside of at least one of the service areas on the geographical display.

11. The method of claim 10, wherein the alert is visual or aural.

12. A system for displaying information on a geographical display comprising:
a memory which stores instructions; and
one or more processors attached to the memory wherein the one or more processors, when executing the stored instructions is configured to:
compute for an individual vehicle at any chosen time of a voyage multiple resource exhaustion distances for a plurality of resources with any chosen combinations of parameters characterizing the voyage based on resource exhaustion time of each resource and vehicular velocity;
generate a service area for each of the plurality of resources, wherein a directional bias is computed for the service area, wherein a current location symbol is rendered on the service area and the position of the current location symbol is representative of the directional bias, and wherein each service area is sized proportionally to a corresponding resource exhaustion distance;
multiply the corresponding resource exhaustion distance by a scale factor to compute a scaled resource exhaustion distance having a service area defined by the scaled resource exhaustion distance; and
display each service area simultaneously on the geographical display, wherein each service area is displayed relative to a current position on the geographical display, thereby allowing the user to choose a preferred destination for the voyage based on the display.

13. The system of claim 12, wherein the memory further comprises instructions that when executed by the one or more processors, cause the system to:
receive telemetry data from a plurality of aircraft, wherein the telemetry data comprises a minimum resource exhaustion distance for each of the plurality of aircraft; and
render a service area on a map display for each of the plurality of aircraft, wherein the service area corresponds to the minimum resource exhaustion distance for each of the plurality of aircraft.

14. A system for displaying information on a geographical display comprising:
one or more computer processors;
memory containing computer instructions, and configured to be readable by the one or more computer processors;
a current position input;
a speed input;
a cabin oxygen level input;
an altitude input;
a fuel level input; and
a display;
wherein the one or more processors, when executing the instructions in the memory, are configured to:
compute a resource exhaustion distance for fuel at a current altitude received from the altitude input;
compute a resource exhaustion distance for cabin oxygen at the current altitude;
multiply the corresponding resource exhaustion distance by a scale factor to compute a scaled resource exhaustion distance having a service area defined by the scaled resource exhaustion distance;
multiply the corresponding resource exhaustion distance by a scale factor to compute a scaled resource exhaustion distance having a service area defined by the scaled resource exhaustion distance;
render a service area for fuel on the display;
render a service area for cabin oxygen on the display;
compute a directional bias for the service area for fuel and the service area for cabin oxygen, wherein a current location symbol is rendered on the service area for fuel and the service area for cabin oxygen, and the position of the current location symbol is representative of the directional bias.

15. The system of claim 14,
wherein the memory further comprises instructions that when executed by the one or more processors, cause e system to:
compute a resource exhaustion distance for fuel at a plurality of altitudes;
compute a resource exhaustion distance for cabin oxygen at a plurality of altitudes;

compute a minim resource exhaustion distance for each of the plurality of altitudes;

compute a largest minimum resource exhaustion distance; and display an altitude corresponding to the largest minimum resource exhaustion distance.

16. The system of claim 15, wherein the memory further comprises instructions that when executed by the one or more processors, cause e system to:

display a speed corresponding to the largest minimum resource exhaustion distance.

17. The system of claim 15, wherein the memory further comprises instructions that when executed by the one or more processors, cause the system to indicate airports that are within a service area representative of the largest minimum resource exhaustion distance.

18. The system of claim 17, wherein the memory further comprises instructions that when executed by the one or more processor, cause the system to generate an alarm if a selected airport is not within a service area representative of the largest minimum resource exhaustion distance.

* * * * *